3,052,976
PRODUCTION OF WROUGHT TITANIUM
Elliott H. Rennhack, Palmerton, Pa., assignor to The New Jersey Zinc Company, New York, N.Y., a corporation of New Jersey
No Drawing. Filed Oct. 23, 1958, Ser. No. 769,087
17 Claims. (Cl. 29—420)

The invention relates to the production of a coalesced wrought titanium product from titanium granules, and has for its object the provision of an improved method of producing a coalesced wrought product, such as a ductile wrought bar, rod or sheet, from titanium granules, such as titanium sponge and the like. The invention also contemplates the provision of a novel self-supporting shape of granular titanium capable of being transformed by plastic deformation directly into a substantially homogeneous wrought titanium product.

The invention is based on my discovery that by encasing a shaped mass of titanium granules in a surface layer of fused titanium, the shaped mass of granules can be coalesced by plastic deformation into a ductile wrought product. Thus, in its broad aspect, the invention involves forming a granular mass consisting predominantly of titanium granules into a shape of suitable configuration for metal fabrication, fusing the surface of the shape until it is encased by a fused surface layer consisting mostly of titanium, and plastically deforming the surface-fused shape under forces including simultaneous compression and tension such, for example, as by rolling and forging (as distinguished from extrusion) during which the fused casing holds the granules together and prevents penetration of air into the compact until the granules coalesce into a wrought titanium base product.

In practicing the invention, a wide variety of granular titanium materials are available, such as the titanium sponges commercially produced by various manufacturers. Generally, these granular materials will be of a size mostly (i.e. in excess of 50% by weight) on 35 mesh standard Tyler screen series, and generally at least 80% by weight will be plus 80 mesh. Even titanium granules consisting generally of pieces about ½ inch in size may be satisfactorily used in practicing the invention. While sponge hardness does not appear to be a controlling variable in the practice of the invention, the granular titanium materials which I have used have varied in Brinell hardness from about 100 to about 135.

When the granular mass consits solely of titanium, the titanium granules should be high grade, preferably with a titanium content not less than 99.5%. However, the invention is not restricted to granular masses composed solely of titanium, but is applicable to granular masses of titanium alloyed, mixed or otherwise associated with other suitable and compatible metals. The granular mass will consist predominantly, i.e. in excess of 50% by weight, of titanium, which together with the other metals or alloys mixed or otherwise associated therewith will be physically in the form of granules of the character hereinbefore described.

The granular mass is shaped in any suitable manner. For example, a mass of granules can be charged to a case having removable sides so that by removing one side at a time each exposed surface of the loose mass can be fused so as to ultimately form a self-supporting shape. On the other hand, I have found it convenient and advantageous to compact a granular mass under a pressure up to 30 tons per square inch and higher, the amount of pressure generally being determined as that required to form the compacted mass into a self-supporting shape. Very satisfactory results are attained with a compacting pressure of from 10 to 20 tons per square inch. The shape should be of a suitable configuration for plastic deformation, which for metal rolling may advantageously be a billet-like parallelepiped. Individual shapes may be juxtaposed or superposed in order to produce a multiple shape of increased length, width or thickness. The juxtaposed or superposed shapes need only be held in close intimate contact (and not otherwise united) until the multiple shape is completely encased in the fused surface layer.

Fusing or welding of all exterior surfaces of the shape may be effected in any appropirate manner. The aim is to encase the shaped mass of granular, non-sintered titanium metal by a fused surface layer consisting mostly of titanium. Since titanium predominates in the composition of the shaped mass, the fused surface layer will be composed mostly (i.e. in excess of 50% by weight) of titanium, and where the shape is made up solely of titanium granules the fused surface layer will be fused titanium. The thickness of the fused layer need be only sufficient to insure that the granules are held together and air penetration into the interstices of the shape is prevented during the subsequent steps of metal fabrication. The minute amount of air trapped within the shape does not appear to impair the quality of the final wrought product, but where even this minute amount of air is considered undersirable it can be removed by carrying out the fusion of the surface of the shape under a vacuum. A fused surface case of a thickness within the range of $\frac{1}{16}$ to $\frac{1}{4}$ inch has generally been found satisfactory in practicing the invention with shapes from 1¼ to 3 inches in thickness. The thickness of the continuous fused surface layer or case will however be largely determined by the size of the shape and the temperature of metal fabrication, and may in some cases be as much as ½ inch. Surface fusion or welding may be carried out by an arc in an inert atmosphere, and saisfactory results have been attained with a tungsten-tipped electrode in an argon atmosphere. An argon shielded tungsten electrode has also been successfully employed for fusing the exterior surfaces of the shape. Additionally, fusion of the exterior surfaces of the shape may be attained by a consumable electrode of titanium or titanium alloy; by using a titanium alloy consumable electrode to fuse the surface of a titanium metal compact, or vice versa, the case and the main body of the shape can be made to have different compositions. In lieu of an inert atmosphere, surface contamination during surface fusion may be prevented by the use of a fused salt protective flux or cover or by the use of a vacuum.

The surface-fused shape is subjected to the aforementioned plastic deformation, such as rolling or forging, at a temperature sufficiently high to effect coalescence of the compacted granules into a wrought titanium base product. The act of coalescence during rolling involves motion and deformation of the granules and a reduction in the porosity of the original cold shaped billet. The minimum rolling temperature for any billet will be that at which these events can occur with reasonable facility. Furthermore, any rolling which work hardens the metal beyond its capacity to absorb such working will result in rupture of the material. On the other hand, if the rolling temperature is too high, the strength of the fused case at this temperature may be insufficient to withstand the stresses imposed on it during rolling and the case may rupture. Rolling temperatures within the range of 400° to 950° C. generally meet these requirements.

Since the invention has been found of special advantage in producing titanium base sheet or strip, metal fabrication by hot rolling will be particularly described. Rolling of the surface-fused shape to final gauge is effected in a plurality of passes. In general, the percentage reduction of each pass will be within the range of 5 to 50% or even higher, especially in the early passes. The first 40 percent or so of the reduction in thickness involves little or no extension of the fused-surface billet in length. The rolling pressures are expended in hot-compacting the granules to minimum porosity. As the billet density rises, true rolling reduction starts. The work may be reheated between passes to maintain the desired rolling temperature. Temperatures in excess of about 950° C. are unnecessary, and tend to increase the rate of surface contamination by oxygen. With two passes, without intermediate reheating, the work may cool to 600° C. (dull red heat) by the time the second pass is taken where the temperature of the initial pass is around 950° C. Later passes may be carried out at lower temperatures within the aforementioned range and, with especially soft grades of substantially pure titanium, coalescence may be obtained at much lower temperatures, even at room temperature. At rolling temperatures within the aforementioned ranges, satisfactory coalescence of the titanium granules into a practically homogeneous wrought ductile metal of high density is achieved. The fused case surrounding the shaped titanium granules provides a means for holding the granular shape together until coalescence has taken place and also prevents the penetration of air into the interstices of the shape, and thus avoids internal contamination by oxygen and nitrogen, while the density of the shape is being raised by the plastic deformation to which it is subjected pursuant to the invention. The fused case thus becomes an integral part of the final homogeneous wrought product and does not have to be removed as it was with previously-used iron and steel encapsulated granular masses. The mechanism of coalescence and integration appears to involve the galling action of particles rubbing on one another and on the fused case, possibly resulting in an increase in surface energy and activity. With most metals galling is disadvantageous in conventional fabrication practices, but the present invention takes advantage of the characteristic galling action of titanium. This mechanism involving galling clearly differs from that occurring during sintering.

Practice of the invention is further illustrated by the following examples:

EXAMPLE I

The starting material was a titanium sponge of about 100 Brinell hardness, having the following screen analysis:

Mesh fraction: Weight percent
+8 ---------------------------------- 2.0
+35 --------------------------------- 53.0
+60 --------------------------------- 18.5
+80 --------------------------------- 10.6
+100 -------------------------------- 4.9
+200 -------------------------------- 9.9
−200 -------------------------------- 1.1

Chemically, the sponge was practically pure titanium, containing only the following insignificant amounts of contaminants:

Contaminant: Weight percent
Chlorine ---------------------------- 0.063
Iron -------------------------------- 0.003
Oxygen ------------------------------ 0.050
Hydrogen ---------------------------- 0.002
Nitrogen ---------------------------- 0.010
Carbon ------------------------------ 0.030

The sponge was thoroughly mixed and two compacts, each 3" long by 2" wide by 1½" thick, were compacted at 10 t.s.i. exerted normally to the 3" x 2" face. One end of each billet-like compact was cut or beveled to a 45 degree angle with a circular saw, and the two compacts were abutted or juxtaposed at the beveled surfaces. The entire exterior surface of the multiple compact was fused to a depth of about ⅛", using a tungsten-tipped electrode in an argon atmosphere. The arc was held at 250 amperes at 20 volts, and no special attention was given the beveled interface.

The resulting surface-fused billet-like compact was preheated to a 950° C. furnace temperature and was rolled under the following schedule:

| Pass No. | Percent reduction | Gage thickness-inches |
|---|---|---|
| 1 | 20 | 1.270 |
| 2 | 20 | 1.019 |
| Reheated to 950° C. | | |
| 3 | 40 | 0.610 |
| 4 | [1] 40 | 0.365 |
| Reheated to 950° C. | | |
| 5 | 40 | 0.220 |
| 6 | 40 | 0.128 |
| Cooled to room temperature, reheated to 400° C. | | |
| 7 | ([2]) | 0.069 |

[1] Billet turned 90 degrees to widen strip: Total heating time, 38 minutes; total reduction, 96 percent.
[2] Several passes.

Standard tension test specimens, ½" wide and 2" long, were machined from the rolled strip after chemically removing the oxidized strip surface. The specimens were annealed for one hour at 700° C. in vacuum. The grain size obtained varied between 0.025 and 0.035 mm. average diameter, and the density was 4.5 grams per cubic centimeter which is the theoretical density for titanium metal.

Tension tests were made using approved standard procedures. Specimens were selected to test the strip in the end sections and across the joint section where the two compacts were abutted. The following test data were obtained:

| | End section | Joint section | Average |
|---|---|---|---|
| Rockwell A hardness | 49 | 46 | 48 |
| Tensile strength, p.s.i | 60,300 | 55,600 | 59,000 |
| Yield strength, p.s.i | 40,300 | 35,600 | 38,100 |
| Proportional limit, p.s.i | 30,900 | 25,800 | 29,500 |
| Elongation, percent | 26 | 30 | 27 |
| Reduction in area, percent | 40 | 44 | 41 |
| Elastic modulus, p.s.i | 15,000,000 | 16,000,000 | 15,000,000 |

EXAMPLE II

A billet 3" thick by 5" wide, and having a top length of 5" and a bottom length of 8" which provided a 45° slope at one end of the billet, was formed from the same titanium sponge starting material which is described in Example I. The billet was compacted from one side at 10 t.s.i. The entire surface of the billet was fused to a depth of ⅛ to ¼" by the same procedure as that described in Example I.

The resulting billet-like compact having a continuous fused surface was preheated to a 950° furnace temperature and was rolled under the following schedule in which each reheating involved return of the work to the same furnace temperature:

*Rolling Schedule For 3″ Thick Billet*

| Pass No. | Percent reduction | Gage thickness, in. | Actual thickness |
|---|---|---|---|
| 1 | 10 | 2.700 | |
| 2 | 10 | 2.430 | |
| 3 | 10 | 2.190 | |
| 4 | 10 | 1.970 | |
| 5 | 10 | 1.770 | |
| 6 | 10 | 1.590 | 1.578 |

Reheated and rotated 90°

| 7 | 10 | 1.420 | |
| 8 | 10 | 1.278 | |
| 9 | 10 | 1.150 | |
| 10 | 10 | 1.035 | |
| 11 | 10 | .931 | .925 |

Reheated

| 12 | 10 | .832 | |
| 13 | 10 | .749 | |
| 14 | 10 | .674 | |
| 15 | 10 | .607 | |
| 16 | 10 | .546 | .540 |

Reheated

| 17 | 15 | .459 | |
| 18 | 15 | .390 | |
| 19 | 15 | .331 | |
| 20 | 10 | 2.98 | |
| 21 | 10 | .268 | |
| 22 | 10 | .241 | .238 |

Reheated

| 23 | 30 | .135 | |
| 24 | 20 | .108 | |
| 25 | 15 | .092 | |
| 26 | 10 | .083 | |
| 27 | 10 | .075 | .075 |

Sheet dimensions ............ 11′-2¼″ x 7″ x .075″.
Total reduction ............ 97.5%.
Total heating time ............ 77 minutes.
Ingot preheat temperature .... 950° C.

The final sheet was subsequently annealed for one hour in a vacuum furnace maintained at 700° C. A specimen of the annealed sheet was subjected to chemical analysis with the following result:

| | Weight percent | |
|---|---|---|
| | $H_2$ | $O_2$ |
| Center | 0.004 | 0.17 |
| End-1 | 0.003 | 0.14 |
| End-2 | 0.003 | 0.14 |

NOTE.—Grain size equals .030-.035 mm.

The following test data was obtained on the same type of test specimens and under the same conditions reported in Example I:

| | With Grain | Across Grain | Average |
|---|---|---|---|
| Hardness $R_A$ | 52 | 53 | 52 |
| Tensile strength, p.s.i. | 72,000 | 66,700 | 70,600 |
| Yield point, p.s.i. | 51,200 | 53,100 | 51,800 |
| Proportional limit, p.s.i. | 39,800 | 44,600 | 41,100 |
| Elongation in 2″, percent | 20 | 15 | 18 |
| Reduction in area, percent | 30 | 20 | 25 |
| Modulus, p.s.i. | 15,500,000 | 16,400,000 | 16,000,000 |
| Bend ductility | 3T | 2T | 2T |
| Grain size | 0.035 | 0.035 | 0.035 |

EXAMPLE III

A 5″ x 5″ x 3″ billet of the same starting material as in Example I was pressed at 10 t.s.i. and surface fused pursuant to the invention. It was heated to 950° C. in air and was pressed in a 5″ direction in a single step. The resulting reduction in height was about 75%. Tension test data on specimens cut from the resulting plate were as follows:

$R_A$ Hardness ............ 44.
Tensile strength ............ 66,400 p.s.i.
Yield strength ............ 52,500.
Proportional limit ............ 34,300.
Elongation ............ 10 percent.
Reduction in area ............ 17 percent.
Elastic modulus ............ 17,000,000 p.s.i.
Density ............ 4.425 g./cc.

EXAMPLE IV

A 5″ x 5″ x 3″ billet the same as that of Example III was pressed at 10 t.s.i. and was surface fused pursuant to the invention. It was then heated to 950° C. in air and was hammer forged into a rod about 1″ in diameter without reheating. Tension test data on specimens cut from this rod were as follows:

$R_A$ Hardness ............ 48.
Tensile strength ............ 69,100 p.s.i.
Elongation ............ 11 percent.
Reduction in area ............ 29 percent.
Density ............ 4.49 g./cc.

EXAMPLE V

A 4″ x 3″ cavity was filled with titanium granules the same as those described in Example I to a depth of 1⅛″ without pressure. This uncompacted material was then surface fused pursuant to the invention. The resulting billet was heated to 950° C. and was hammer forged to ½″ diameter with one reheating. Tensile values were as follows:

$R_A$ Hardness ............ 48.
Tensile strength ............ 68,400 p.s.i.
Yield strength ............ 59,800 p.s.i.
Proportional limit ............ 47,700 p.s.i.
Elongation ............ 14 percent.
Reduction in area ............ 29 percent.
Elastic modulus ............ 15,000,000 p.s.i.
Density ............ 4.49 g./cc.

EXAMPLE VI

A 4″ x 3″ x 3″ uncompacted billet the same as that of Example V was surface fused pursuant to the invention. It was then rolled at 950° C. according to the following schedule:

| Pass No. | Percent reduction | Actual thickness, in. |
|---|---|---|
| 1 | 15 | |
| 2 | 15 | |
| 3 | 15 | |
| 4 | 10 | |
| 5 | 10 | |
| 6 | 10 | |
| 7 | 10 | |
| 8 | 10 | |
| 9 | 10 | |
| 10 | 10 | |
| 11 | 10 | |
| 12 | 10 | |
| 13 | 10 | |
| 14 | 10 | |
| 15 | 10 | |
| 16 | 10 | 0.489 |

Reheated

| 17 | 30 | |
| 18 | 30 | |
| 19 | 30 | |
| 20 | 30 | |
| 21 | 20 | |
| 22 | 20 | 0.071 |

NOTE.—Total reduction equals 97%.

The with-grain tension properties after annealing for one hour at 700° C. in vacuo were as follows:

| | |
|---|---|
| R_A Hardness | 50. |
| Tensile strength | 68,400. |
| Yield strength | 47,400. |
| Proportional limit | 40,500. |
| Elongation | 22. |
| Reduction in area | 36. |
| Elastic modulus | 17,000,000. |
| Minimum bend | 0.51 T. |
| Density | 4.5. |

EXAMPLE VII

A 4" x 3" x 1" uncompacted billet the same as that of Example V was surface fused pursuant to the invention and was rolled to 0.071" at 950° C. under the following schedule:

| Pass No. | Percent reduction | Actual thickness, in. |
|---|---|---|
| 1 | 20 | |
| 2 | 20 | |
| Turned 90° | | |
| 3 | 20 | |
| 4 | 15 | |
| 5 | 15 | |
| 6 | 10 | |
| 7 | 10 | 0.311 |
| Reheated | | |
| 8 | 30 | |
| 9 | 30 | |
| 10 | 30 | |
| 11 | 20 | |
| 12 | 10 | 0.071 |

NOTE.—Total reduction equals 93%.

The with-grain tension test properties after annealing for one hour at 700° C. in vacuo were as follows:

| | |
|---|---|
| R_A Hardness | 48. |
| Tensile strength | 65,200 p.s.i. |
| Yield strength | 46,700 p.s.i. |
| Proportional limit | 40,100 p.s.i. |
| Elongation | 18 percent. |
| Reduction in area | 30 percent. |
| Elastic modulus | 15,000,000 p.s.i. |
| Minimum bend | <2.1 T. |
| Density | 4.5. |

The foregoing test data show that the method of the invention coalesces the individual granules of the titanium sponge into a ductile, homogeneous, wrought structure. Bending, twisting and other tests for ductility yielded qualitative confirmation.

While the invention is herein described as applied to the production of wrought titanium, the principles of the invention are equally applicable to the similar and equivalent metals zirconium, hafnium, tantalum and columbium and it is to be understood that in the appended claims I intend to include these other metals as equivalents of titanium.

I claim:
1. The method of producing a coalesced wrought titanium base product from a granular mass consisting predominantly of titanium which comprises forming the granular mass into a shape of suitable configuration for metal fabrication, fusing the surface of the shape until it is encased by a fused surface layer consisting mostly of titanium, and subjecting the resulting surface-fused shape of granular metal to plastic deformation during which the fused casing holds the discrete granules together and prevents penetration of air into the interstices of the shape until the granules coalesce into a wrought titanium base product.

2. The method of producing a coalesced wrought titanium base product from a granular mass consisting predominantly of titanium which comprises compacting the granular mass under pressure into a compact of suitable configuration for metal fabrication, fusing the surface of the compact until it is encased by a fused surface layer consisting mostly of titanium, and subjecting the resulting surface-fused compact of granular metal to plastic deformation during which the fused casing holds the discrete granules together and prevents penetration of air into the interstices of the compact until the granules coalesce into a wrought titanium base product.

3. The method of producing a coalesced wrought titanium base product from a granular mass consisting predominantly of titanium which comprises compacting the granular mass at a pressure up to 30 tons per square inch into a compact of suitable configuration for metal fabrication, fusing the surface of the compact until it is encased by a fused surface layer consisting mostly of titanium, and subjecting the resulting surface-fused compact of granular metal to plastic deformation at temperatures sufficiently high to effect coalescence of the compacted discrete granules into a wrought titanium base product.

4. The method of producing a coalesced wrought titanium base product from a granular mass consisting predominantly of titanium which comprises forming the granular mass into a self-supporting shape of suitable configuration for metal rolling, fusing the surface of the shape until it is encased by a fused surface layer consisting mostly of titanium of sufficient thickness to hold the discrete granules together and prevent penetration of air into the interstices of the shape during the subsequent steps of metal rolling, and rolling the surface-fused shape of granular metal into a ductile wrought titanium base product.

5. The method of producing a coalesced wrought titanium base product from a granular mass consisting predominantly of titanium which comprises compacting the granular mass at a pressure up to 30 tons per square inch into a compact of suitable configuration for metal rolling, fusing the surface of the compact until it is encased by a fused surface layer consisting mostly of titanium of sufficient thickness to hold the discrete granules together and prevent penetration of air into the interstices of the compact during the subsequent steps of metal rolling, and rolling the surface-fused compact of granular metal into a ductile wrought titanium base product.

6. The method of claim 5 in which the compacting pressure is within the range of 10 to 20 tons per square inch.

7. The method of claim 1 in which the thickness of the fused surface layer is within the range of one-sixteenth to one-half inch.

8. The method of claim 5 in which the thickness of the fused surface layer is within the range of one-sixteenth to one-half inch.

9. The method of claim 4 in which the temperature of the surface-fused shape at the initial rolling pass is within the range of 400 to 950° C.

10. The method of claim 1 in which the granular mass consists solely of substantially pure titanium granules and rolling is carried out at room temperature.

11. The method of claim 1, in which a plurality of individual shapes are formed into a multiple compact by juxtaposing the individual shapes in close physical contact but not otherwise united, the entire multiple shape being encased by a fused surface layer and then subjected to plastic deformation as specified in claim 1.

12. The method of claim 5, in which a plurality of individual compacts are formed into a multiple compact by juxtaposing the individual compacts in close physical contact but not otherwise united, the entire multiple compact being encased by a fused surface layer and then subjected to plastic deformation as specified in claim 5.

13. The method of producing a coalesced wrought titanium base product from a granular mass consisting predominantly of titanium granules which comprises compacting the granular mass at a pressure within the range of 10 to 20 tons per square inch into a compact of suitable configuration for metal fabrication, fusing the surface of the compact until it is enclosed by a fused surface layer consisting mostly of titanium, the thickness of said fused surface layer being within the range of one-sixteenth to one-quarter inch, and subjecting the resulting surface-fused compact of granular metal to plastic deformation during which the fused casing holds the discrete granules together and prevents penetration of air into the interstices of the compact until the granules coalesce into a ductile wrought titanium base product.

14. The method of producing a coalesced wrought titanium base product from a granular mass consisting predominantly of titanium which comprises compacting the granular mass at a pressure up to 30 tons per square inch into self-supporting compacts of suitable configuration for metal fabrication, forming a plurality of said compacts into a multiple compact by juxtaposing the individual compacts in close physical contact but not otherwise united, fusing the surface of the multiple compact until it is entirely encased by a fused surface layer consisting mostly of titanium, and subjecting the resulting surface-fused multiple compact of granular metal to plastic deformation during which the fused casing holds the discrete granules together and prevents penetration of air into the interstices of the multiple compact until the granules coalesce into a wrought titanium base product.

15. The method of producing a coalesced wrought titanium base product from a granular mass consisting predominantly of titanium which comprises forming the granular mass into a self-supporting shape of suitable configuration for metal forging, fusing the surface of the shape of granular metal until it is encased by a fused surface layer consisting mostly of titanium of sufficient thickness to hold the discrete granules together and prevent penetration of air into the interstices of the shape during the subsequent steps of metal forging, and forging the surface-fused shape into a ductile wrought titanium base product.

16. The method of claim 15 in which the thickness of the fused surface layer is within the range of one-sixteenth to one-half inch.

17. The method of claim 15 in which the temperature of the surface-fused shape at the initiation of forging is within the range of 400 to 950° C.

References Cited in the file of this patent
UNITED STATES PATENTS

| | | |
|---|---|---|
| 1,992,549 | Short et al. | Feb. 26, 1935 |
| 2,206,395 | Gertler | July 2, 1940 |
| 2,291,685 | Brassert | Aug. 4, 1942 |
| 2,457,861 | Brassert | Jan. 4, 1949 |
| 2,746,134 | Drummond | May 22, 1956 |
| 2,753,623 | Boessenkool et al. | July 10, 1956 |
| 2,757,446 | Boegehold et al. | Aug. 7, 1956 |
| 2,873,517 | Wellman | Feb. 17, 1959 |